US008150170B2

(12) United States Patent
Li et al.

(10) Patent No.: US 8,150,170 B2
(45) Date of Patent: Apr. 3, 2012

(54) STATISTICAL APPROACH TO LARGE-SCALE IMAGE ANNOTATION

(75) Inventors: Mingjing Li, Beijing (CN); Xiaoguang Rui, Hefei (CN)

(73) Assignee: Microsoft Corporation, Redmond, WA (US)

(*) Notice: Subject to any disclaimer, the term of this patent is extended or adjusted under 35 U.S.C. 154(b) by 923 days.

(21) Appl. No.: 12/130,943

(22) Filed: May 30, 2008

(65) Prior Publication Data

US 2009/0297050 A1 Dec. 3, 2009

(51) Int. Cl.
*G06K 9/72* (2006.01)
(52) U.S. Cl. ............................. 382/230; 382/228
(58) Field of Classification Search ........... 382/224–231
See application file for complete search history.

(56) References Cited

U.S. PATENT DOCUMENTS

| | | | |
|---|---|---|---|
| 7,028,253 | B1 | 4/2006 | Lieberman et al. |
| 7,043,474 | B2 | 5/2006 | Mojsilovic et al. |
| 7,231,381 | B2 | 6/2007 | Li et al. |
| 7,761,466 | B1* | 7/2010 | Eshghi .......................... 707/772 |
| 2002/0052870 | A1* | 5/2002 | Charlesworth et al. ........... 707/3 |
| 2004/0225686 | A1 | 11/2004 | Li et al. |
| 2005/0114325 | A1 | 5/2005 | Liu et al. |
| 2006/0020597 | A1 | 1/2006 | Keating et al. |
| 2007/0047782 | A1* | 3/2007 | Hull et al. ..................... 382/124 |
| 2007/0047819 | A1* | 3/2007 | Hull et al. ..................... 382/190 |
| 2007/0165904 | A1* | 7/2007 | Nudd et al. .................... 382/100 |
| 2007/0214114 | A1 | 9/2007 | Liu et al. |
| 2007/0239756 | A1* | 10/2007 | Li et al. .......................... 707/102 |
| 2008/0059512 | A1* | 3/2008 | Roitblat et al. ................ 707/102 |
| 2008/0178120 | A1* | 7/2008 | Yamamoto .................... 715/838 |
| 2008/0205774 | A1* | 8/2008 | Brinker et al. ................ 382/225 |
| 2008/0205775 | A1* | 8/2008 | Brinker et al. ................ 382/225 |
| 2008/0215563 | A1* | 9/2008 | Shi et al. .......................... 707/5 |
| 2009/0060351 | A1* | 3/2009 | Li et al. ........................ 382/224 |

OTHER PUBLICATIONS

Glotin, et al., "Fast Image Auto-Annotation with Visual Vector Approximation Clusters", International Workshop on Content-Based Multimedia Indexing (CBMI), 2005, Nov. 22, 2011.
PCT Search Report for PCT Application No. PCT/US2009/045764, mailed Dec. 30, 2009 (10 pages).
Gerfo, "Automatic Image Annotation Based on Learning Visual Cues", at <<http://www.disi.unige.it/person/LoGerfoL/LogerfoL-06-proposta.pdf>>, Dec. 2006, pp. 20.
Hardoon, et al., "A Correlation Approach for Automatic Image Annotation", available at least as early as Oct. 19, 2007, at <<http://eprints.pascal-network.org/archive/00002285/01/ADMA152.pdf>>, pp. 12.
Li, et al., "Image Annotation by Large-Scale Content-based Image Retrieval*", at <<http://research.microsoft.com/users/leizhang/Paper/ACMMM06-Li.pdf>>, ACM, 2006, pp. 4.
Setia, et al., "Feature Selection for Automatic Image Annotation", at <<http://lmb.informatik.uni-freiburg.de/papers/download/se_dagm06.pdf>>, Springer-Verlag Berlin Heidelberg, 2006, pp. 294-303.
Wang, et al., "AnnoSearch: Image Auto-Annotation by Search1", available at least as early as Oct. 19, 2007, at <<http://research.microsoft.com/users/leizhang/Paper/CVPR06_AnnoSearch.pdf>>, pp. 8.
Wang, et al., "Image Annotation Using Search and Mining Technologies1", at <<http://www.it-innovations.ae/iit07/docs/abstract.pdf>>, ACM, 2006, pp. 2.
Wang, et al., "Scalable Search-Based Image Annotation of Personal Images*", at <<http://research.microsoft.com/users/leizhang/Paper/MIR06-Changhu.pdf>>, ACM, 2006, pp. 9.

* cited by examiner

*Primary Examiner* — Jingge Wu
(74) *Attorney, Agent, or Firm* — Lee & Hayes, PLLC (57) ABSTRACT

Statistical approaches to large-scale image annotation are described. Generally, the annotation technique includes compiling visual features and textual information from a number of images, hashing the images visual features, and clustering the images based on their hash values. An example system builds statistical language models from the clustered images and annotates the image by applying one of the statistical language models.

16 Claims, 5 Drawing Sheets

STATISTICAL APPROACH TO LARGE-SCALE IMAGE ANNOTATION

BACKGROUND

With the advent of inexpensive digital cameras, camera phones, and other imaging devices, the number of digital images being taken and posted on the internet has grown dramatically. However, to use these images they must be identified and organized so that they may be browsed, searched, or retrieved.

One solution is manual image annotation in which a person manually enters descriptive text or keywords when the image is taken, uploaded, or registered. Although manual image annotations are generally very accurate (e.g., people generally select accurate descriptions), manual image annotation is time consuming and consequently many digital images are not annotated. In addition, manual image annotation can be subjective in that the person annotating the image may disregard the key features of an image (e.g., people typically annotate images based on the person in the image, when the image is taken, or the location of the image).

Another solution is automatic image annotation which annotates images with keywords automatically. Generally, automatic image annotation is either classification-based or probabilistic modeling-based. Classification-based methods attempt to associate words or concepts by learning classifiers (e.g., Bayes point machine, support vector machine, etc.). While probabilistic modeling methods attempt to infer the correlations or joint probabilities between images and the annotations (e.g., translation model, cross-media relevance model, continuous relevance model, etc.).

While classification-based and probabilistic-based image annotation algorithms are able to annotate small scale image databases, they are generally incapable of annotating large-scale databases with realistic images (e.g., digital pictures).

Moreover, these image annotation algorithms are generally incapable of annotating all the various types of realistic images. For example, many personal images do not contain textual information while web images may include incomplete or erroneous textual information. While current image annotation algorithms are capable of annotating personal image or web images, these algorithms are typically incapable of annotating both types of images.

Furthermore, in large-scale collections of realistic images the number of concepts that can be applied as annotation tags across numerous images is nearly unlimited, and depends on the annotation strategy. Therefore, to annotate large-scale realistic image collections the annotation method should be able to handle the unlimited concepts and themes that may occur in numerous images.

Lastly, given the sizeable number of images being generated everyday, the annotation method must be fast and efficient. For example, approximately one million digital images are uploaded to the FLICKR™ image sharing website each day. To annotate one million images per day, approximately ten images per second must be annotated. Since the best image annotation algorithm annotates an image in about 1.4 seconds, it is incapable of annotating the large number of images that are generated daily.

Accordingly, there is a need for a large-scale image annotation technique that can annotate all types of real-life images, containing an unlimited number of visual concepts, and that can annotate images in near real time.

SUMMARY

This summary is provided to introduce simplified concepts relating to automated image annotation, which is further described below in the Detailed Description. This summary is not intended to identify essential features of the claimed subject matter, nor is it intended for use in determining the scope of the claimed subject matter.

In one aspect, a method of annotating an image may comprise compiling visual features and textual information from a number of images, hashing the images visual features, and clustering the images based on their hash values. Statistical language models are then built from the clustered images and the image is annotated using one of the statistical language models.

In another aspect, a computer readable storage medium comprising computer executable instructions that when executed by a processor may perform a method comprising crawling a large-scale image database to gather images and their corresponding textual information. Visual information is then extracted from the images using a gray block methodology and the extracted images are reduced by employing a projection matrix. The reduced visual information is hashed and the images are clustered according to their hash values. One or more statistical language models are built from the clustered images and a query image is annotated using one or more of the statistical language models.

In yet another aspect, an item record data structure is embodied on a computer readable media, the data structure consists of a digital image and a textual annotation corresponding to the digital image. The textual annotation is associated with the digital image by compiling visual features and textual information from a number of images, hashing the images visual features, and clustering the images based on the hash value. Statistical language models are then built based on the clustered images and the digital image is annotated using one of the statistical language models.

While described individually, the foregoing aspects are not mutually exclusive and any number of aspects may be present in a given implementation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

In a theoretically ideal situation, given a well-annotated image database of unlimited scale, image annotation is relatively straightforward. For a given query image an exact duplicate is found in the image database and that image's annotation is propagated to the query image.

However, in the "real world" image databases are generally limited in scale and contain many inaccurate descriptions.

Accordingly, images in the "real world image database" are typically grouped into clusters according to the images' similarities. Then for a given query image, the most similar image cluster is selected and the "best description" associated with the image cluster is selected to annotate the query image. While these conventional imaging annotation algorithms are capable of annotating most images, there is significant room for improvement.

This disclosure relates to various statistical approaches to large-scale image annotation. These statistical approaches can annotate personal images which generally have limited or no annotations and web-based images, which generally have noisy and incomplete annotations. In one implementation, an image annotation technique leverages large-scale web-based image databases to model a nearly unlimited number of semantic concepts.

Figure 1:
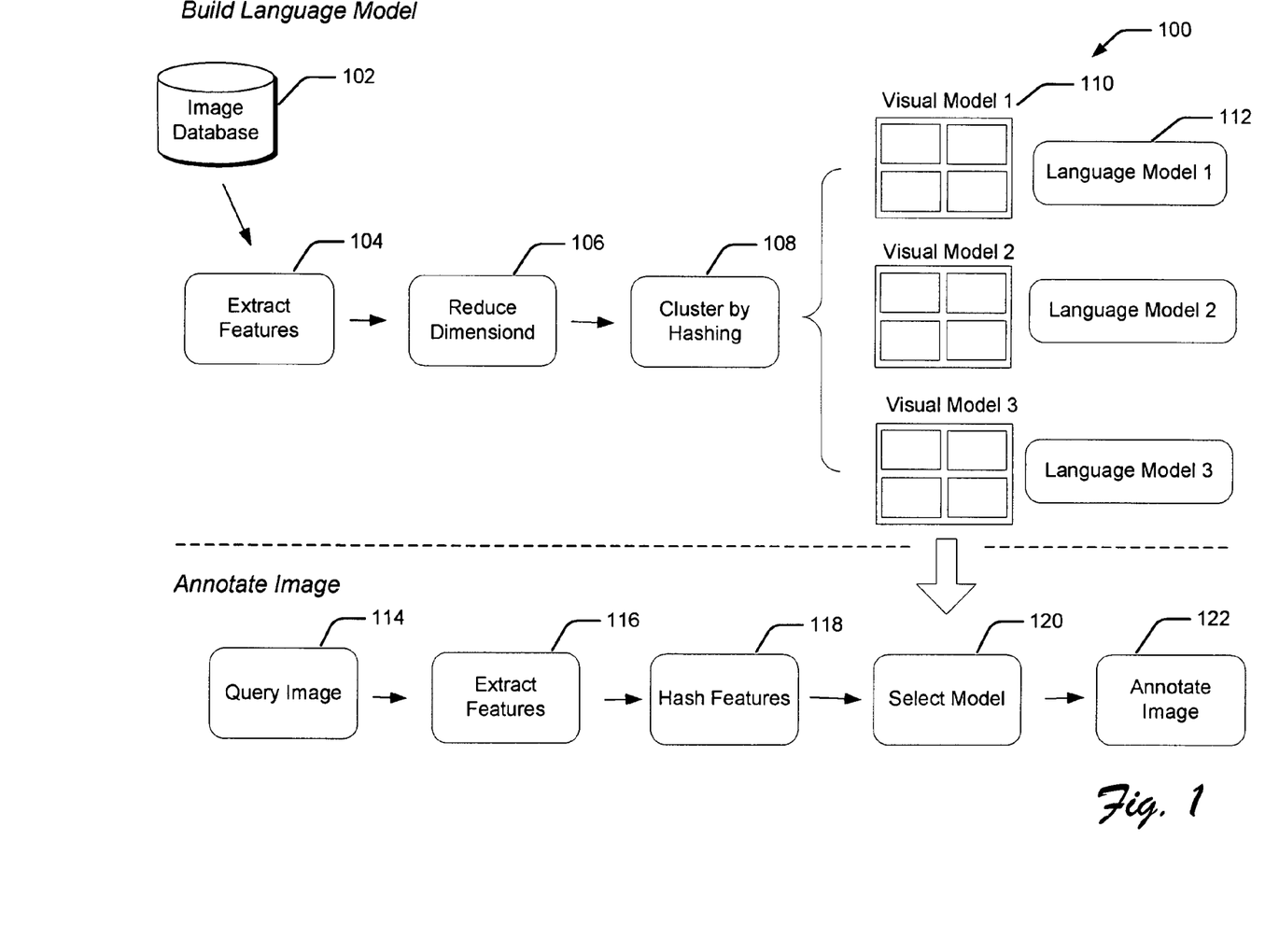
FIG. 1 is a block diagram illustrating one implementation of a large-scale image annotation technique.

FIG. 1 illustrates one implementation of the large-scale image annotation technique 100. First, a large-scale image database 102 is crawled and both visual features and textual information are extracted and indexed as structural data 104 (i.e., training set). The complexity of the image data is reduced by projecting the high-dimensional image features onto a sub-space with lower dimensionality while maintaining the majority of the image's information 106. Then an efficient hash-based clustering algorithm is applied to the training set and the images with the same hash codes are grouped into "clusters" 108. Once the images have been clustered into groups 110, a statistical language model (SLM) is developed to model the textual information from the images in each cluster 112.

To annotate an image, the query image is selected 114 and its visual features (e.g., color, texture, geometric features, etc.) and textual features (e.g., titles, key words, URL's, surrounding text, etc.) are extracted 116. The query image's features are hashed 118 and a language model is selected 120 based on the words with the maximum joint probability with the query image. The image is then annotated 122 based on the text, title, annotations, and/or key word(s) associated with the selected language model 122.

Collecting Images from the Web

Figure 2:
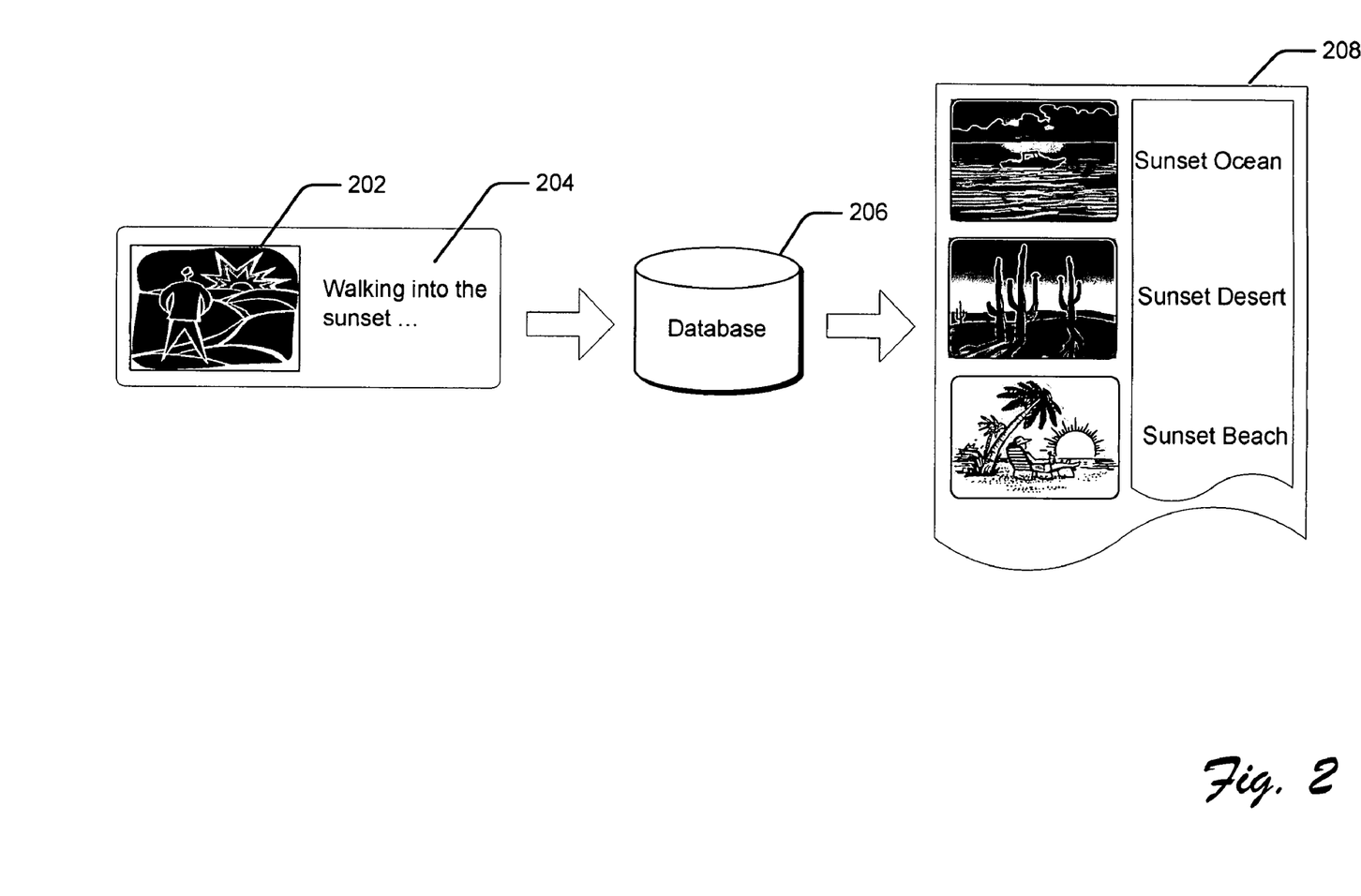
FIG. 2 is a diagram illustrating how images and its accompanying annotations may be collected using a web crawler and archived in a database.

Referring to FIG. 2, in one implementation images 202 along with their text, title, annotations, and/or keywords 204 are collected from the Internet using a web crawler and archived in a database 206. In general, as many images as possible may be collected, as large sample sizes assure a good correlation between the visual models and the query image. For example, in one implementation, approximately 2.4 million high quality web images with meaningful descriptions were collected from online photo forums (e.g., GOOGLE IMAGES™, YAHOO IMAGE SEARCH™, and the University of Washington image data set, to name a few).

Alternatively, annotated images may be collected randomly from the Internet or other sources and assembled into an image collection. Generally, any type of image can be collected so long as it is annotated with some form of text, title, annotation, or key words.

The images and associated text or key words are then indexed in a database. There are many ways in which the images 202 and text 204 can be indexed (e.g., key word, text string, image features, to name a few). In one implementation, the images are sorted and grouped by the key word or text 204 associated with the image 202. For example, if there are a number of images that contain sunsets, those images can be indexed and grouped together 208.

Dimension Reduction

Traditional clustering algorithms are time consuming and computationally inefficient because digital images are generally complex (e.g., highly dimensional). Accordingly, the exemplary technique employs a compact representation of the collected images to achieve fast and efficient image clustering.

One goal of dimension reduction is to reduce the complexity of the image data while maintaining as much of the original information as possible. A second goal of dimension reduction is to reduce noise and value drifting by omitting the least significant dimensions. Both of these goals are achieved in the following illustrative technique.

Figure 3:
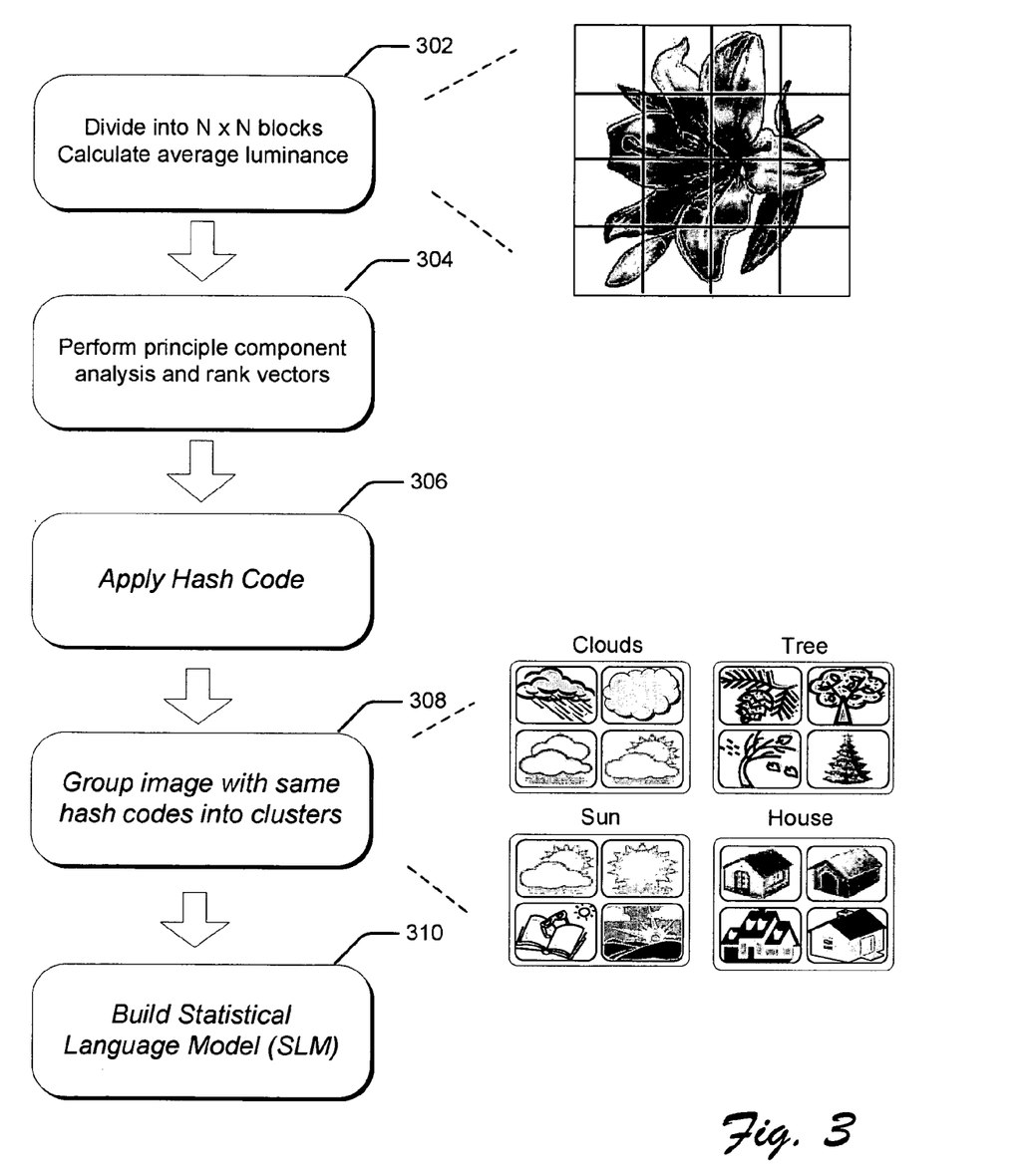
FIG. 3 is a block diagram illustrating how a digital image's visual features may be reduced, the reduced features grouped into clusters, and then based on the clusters a statistical language model developed.

Referring to FIG. 3, an image's visual features should generally represent its content, its structure, and be robust to variations in the image itself (e.g., scale, color, storage format, to name a few). Accordingly, a gray block methodology may be employed. The gray block features may appear as small thumbnails of the original image. The gray block methodology maintains the images primary content and structure, and is invariant to scale change. Each feature vector is the mean of many individual pixels, so the methodology is robust to variances in pixel values. Moreover, since each vector feature is based on the image's luminance, the methodology is also robust to color changes.

In one implementation, each collected image is divided into 8 by 8 pixel blocks and for each block the average luminescence "L" is calculated, at block 302. The K-th dimensional value of each feature may be calculated as:

$$f_k = \frac{1}{N_k} \sum_{i,j \in B_k} I(i,j) \quad k = 1, 2, \ldots, n^2 \qquad (1)$$

Where $B_k$ corresponds to block k, $N_k$ is the number of pixels in $B_k$ and $L(i,j)$ is the pixel luminance at coordinates i, j. Thus, the image is represented by vector $F_i = (f_1, f_2, f_3, \ldots, f_{n*n})^T$. In alternate implementations, the image may be partitioned into a 7×7 gray block, a 9×9 gray block, or any other suitable number of feature vectors.

The high-dimensional features may then be projected into a subspace with much lower dimensionality while maintaining most of the image's information, at block 304. In one implementation, the image's dimensions are reduced by employing a projection matrix "A".

$$G_i = AF_i \qquad (2)$$

To determine the projection matrix A, principle components analysis (PCA) is performed on the feature matrix of a sufficiently large image collection. The image vectors may then be ranked and the vectors corresponding to the largest Eigen values retained to form the projection matrix A. It should be noted that the projection matrix is generally the same for most of the gray block images. Although an image may lose some information through this technique, it has been shown that high precision and the fast cluster grouping are achieved.

Clustering by Hashing

Clustering is the classification of objects into classes, categories, or partitions based on a high degree of similarity between object members. In one implementation, a hash-based clustering algorithm is applied to the training set, at block 306. Such hash code generation is essentially a vector quantization process. Since the final quantized vector has K-bits, the method in which the bits are allocated to each dimension is important. In one implementation, for image vectors with values above "mean$_k$" the image vector has a value of "1" and for image vectors with values below "mean$_k$" the image vector has a value of "0":

$$H_{i,k} = 1 \text{ if } G_{ik} >/= \text{mean}_k \quad (3)$$
$$= 0 \text{ if } G_{ik} < \text{mean}_k$$

where $\text{mean}_k$ is the mean value of dimension K. By employing this technique, the K-dimensional feature vector is transformed into a K-bit binary string, which becomes the images hash code.

In one implementation, the K-bit string is constrained to no more than 32 bits, although other bit string sizes may, such as 64 bits, may be employed. The images with the same 32 bit hash code are then grouped into "clusters", at block 308.

Building a Statistical Language Model

Once the images have been clustered into groups, a statistical language model (SLM) may be developed to model the textual information from the images in each cluster, at block 310. Unigram models and modified bigram models may be constructed to calculate single word probabilities and conditional word probabilities for each of the image clusters.

In general, personal images may lack textual information or annotation, and are accordingly annotated by employing a probabilistic approach. Specifically, the query image may be annotated by selecting keyword(s), a phrase, or text with the maximum joint probability with the query or target image, as illustrated below in equation (4).

Unigram models assume that a particular piece of text or key word is generated by each term independently. Accordingly, unigram models calculate the probability that a specific keyword, phrase, or text is associated with the query image.

$$w^* = \arg\max_w \{p(w, I)\} \quad (4)$$
$$= \arg\max_w \left\{ \sum_c p(w/c)p(I/c)p(c) \right\}$$

In equation (4), p(w/c) is the unigram word probability (i.e., probability that a keyword, phrase, or terms "w" occurs in an image cluster "c"), p(I/c) is the visual similarity between the query image "I" and the image cluster "c", and p(c) is the prior probability of cluster "c", which is often initialized uniformly without knowing the prior information in advance.

For example, if there are ten images in a cluster and two keywords are associated with that cluster. If the first keyword appears in five images and second keyword appears in two images; there is a two in seven chance (29%) that second keyword should be associated with the query image and a five in seven chance (71%) that the first key word should be associated with the query image. Accordingly, since the first keyword has a greater probability than the second keyword that it is associated with the query image (i.e., 71% versus 29%); the first keyword is used to annotate the query image.

In an alternate implementation, the image cluster whose visual features are the most similar to the query image is selected and its keyword, phrase, and/or terms are used to annotate the query image.

Generally, the number of words in a cluster is limited because of the small number of images in a cluster. Therefore, when there are a limited number of words, the unigram model may be smoothed using Bayesian models using Dirichlet priors.

$$p_\mu(w|d) = \frac{c(w, d) + \mu p(w|C)}{\sum_w c(w, d) + \mu} \quad (5)$$

Here, p(w/C) is the unigram probability of a specific keyword "w" occurring in a standard corpus "C".

In general, the typical web image contains noisy and incomplete textual information. Accordingly, a two step probabilistic model may be employed to annotate the web images.

First, available texts "n" are ranked using equation (6), and the lowest ranked words, which may be noisy, are discarded. The highest ranked words are then used as candidate annotations "n*".

$$n^* = \arg\max_n \{p(n, I)\} \quad (6)$$
$$= \arg\max_n \left\{ \sum_c p(n/c)p(I/c)p(c) \right\}$$

In equation (6), p(n,I) is the probability that keyword, phrase, and/or term "n" is associated with web image "I", p(n/c) is the probability that term "n" is associated with image cluster "c", and p(I/c) is the probability that web image "I" is associated with image cluster "c".

Next, the new annotations "w*" are acquired and ranked by determining the average conditional probability p(w,I/n*) for each candidate annotation. The candidate annotations with highest average conditional probabilities may then be selected to annotate the web image.

$$w^* = \arg\max_w \{p(w, I/n^*)\}$$
$$w^* = \arg\max_n \{\Sigma_c p(w/c)p(n^*/w,c)p(I/c)p(n^*/I,c)p(c)\} \quad (7)$$

In equation (7), p(n*/w,c) is the bigram word probability (i.e., average conditional probability that each keyword, terms, or annotation "n*" is associated with image cluster "c" given that "w" is already associated with "c").

For example, if a web image was a picture of the sky with clouds and was annotated with "sky". Clusters with the annotations "sky" and "clouds" would have a high probability that the annotations correlate to the image. While clusters with the annotations "water" and "sky" would have a lower probability and accordingly be discarded.

Annotating Images

Since only a small number of clusters models are typically used to compute the joint probabilities, the exemplary image annotation technique is efficient and does not introduce noisy information.

For personal image annotation, cluster models are selected which are visually similar to the images. Accordingly, the personal images are annotated based on the closest visual image model and textual similarity is not considered.

Figure 4:
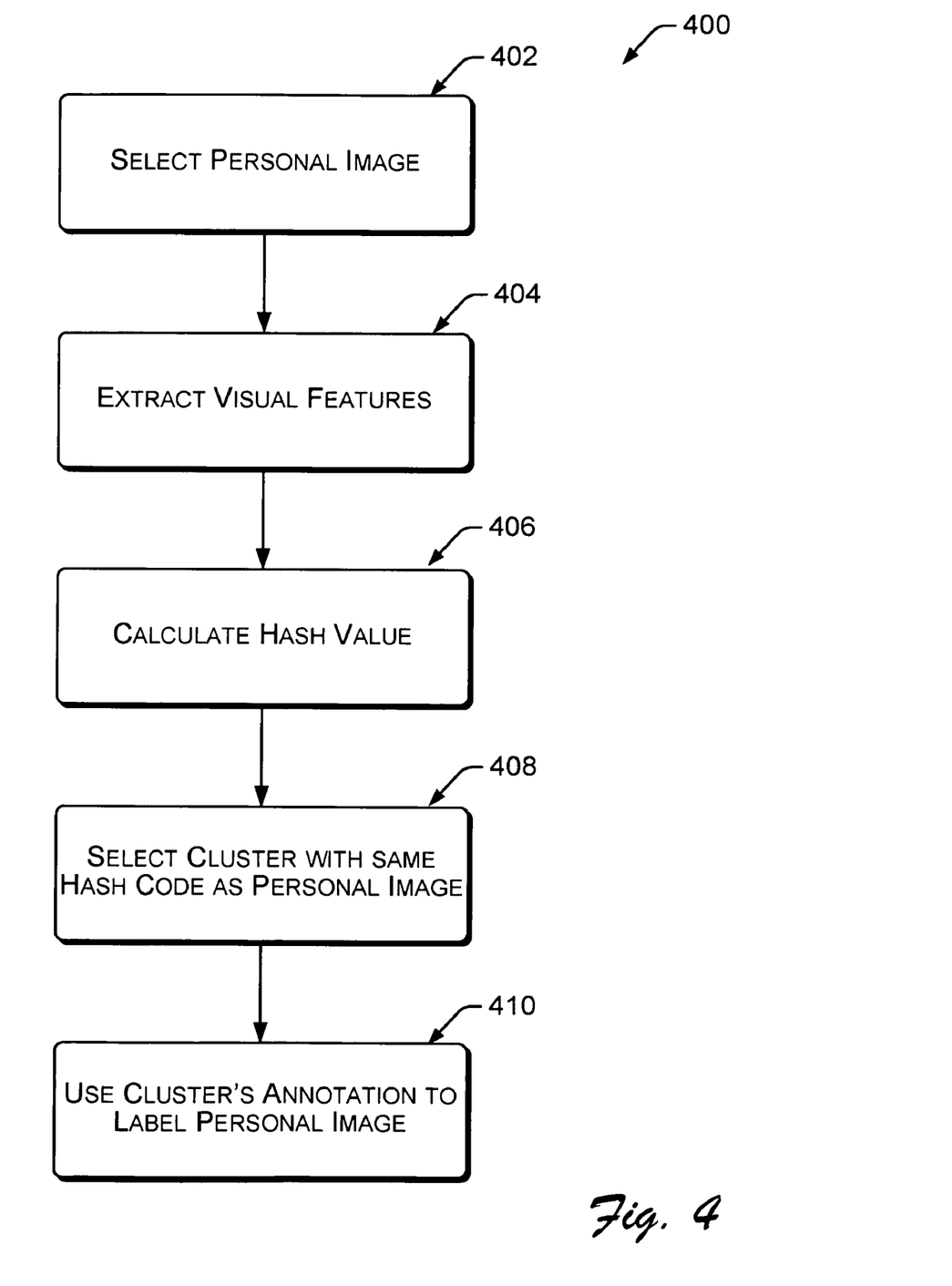
FIG. 4 is a block diagram depicting an illustrative method of annotating a personal image.

FIG. 4 illustrates an illustrative method for annotating personal images 400 according to one implementation. The term "personal image" is to be interpreted broadly and is generally any image without textual information such as keyword(s), labels, textual information, etc. The personal image can be downloaded from a website, retrieved from a computing device (e.g., personal computer, digital camera, picture phone, personal digital assistant, to name a few), scanned from hard copy, or acquired from any other source of digital images, at block 402.

Once the personal image (i.e., query image) has been selected, its visual features may be extracted using a gray block technique, at block 404. In one implementation, the query image is divided into 8×8 blocks and for each block the average luminance "L" is calculated. The query image is then represented as a K-th vector based on the average luminance values $F_i=(f_1, f_2, f_3, \ldots, f_{n*n})^T$. In an alternate implementation, the query image may be partitioned into a 7×7 gray block, a 9×9 gray block, or any other suitable number of gray blocks.

The vector image may then be reduced by employing a projection matrix. The projection matrix "A" is determined by performing principle components analysis (PCA) on the feature matrix. The image vectors are then ranked and the vectors corresponding to the largest Eigen values are retained to form the projection matrix A.

Next, an efficient hash-based clustering algorithm may be performed on the query image, at block 406. In one implementation, the mean value of the image vector is calculated "$mean_k$" and for values above $mean_k$ the image vector is assigned a value of 1 and for values below $mean_k$ the image vector is assigned a value of 0. This transforms the K-dimensional image vector into a K-bit binary string, which becomes the query images hash code.

The query image's hash code is then compared to the hash codes of the various image clusters. The cluster with the same hash code as the query image is selected, at block 408

Finally, the annotation of the selected cluster is used to annotate the query image, at block 410.

Figure 5:
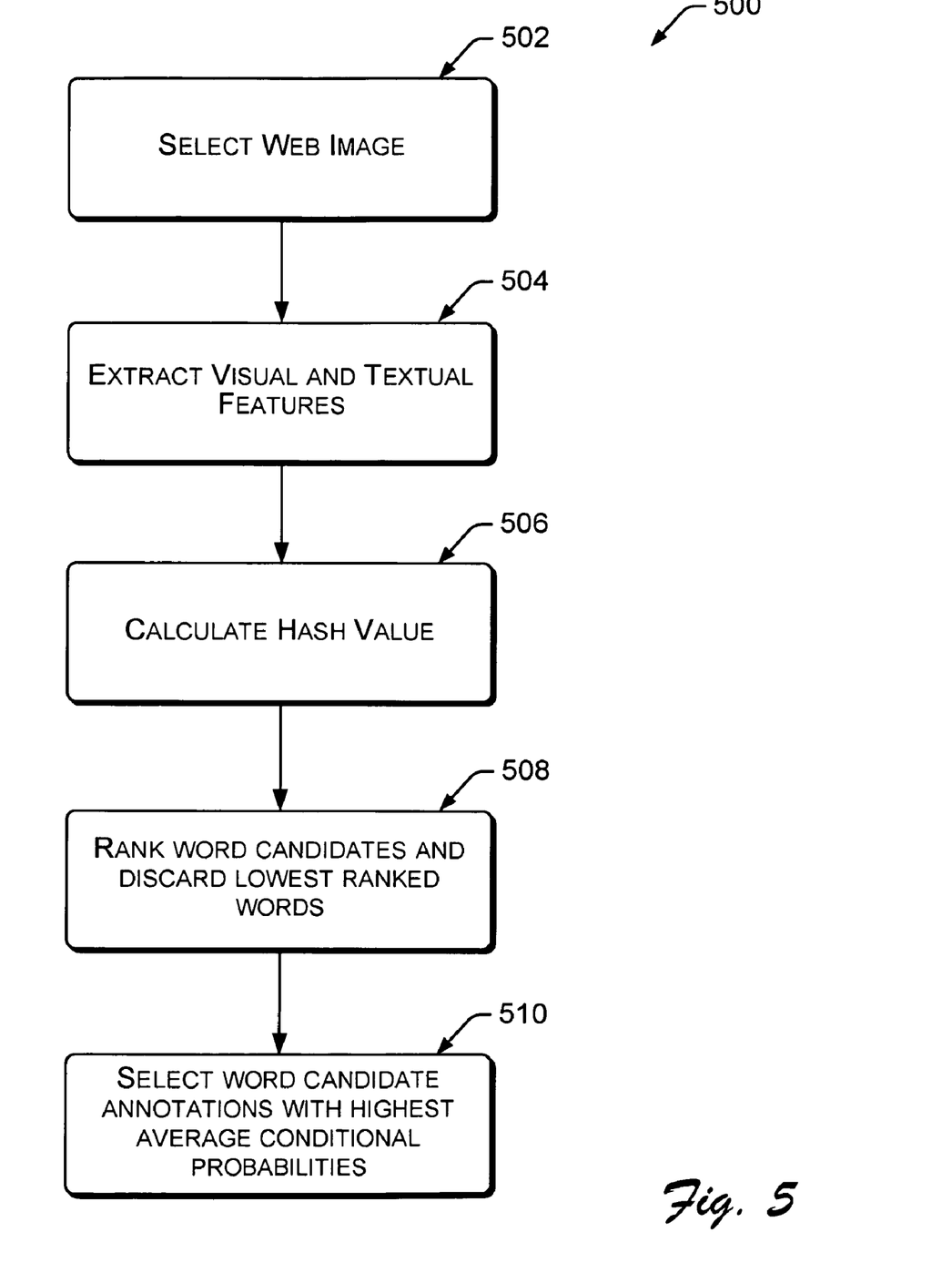
FIG. 5 is a flow diagram depicting an illustrative method of annotating a web image.

For Web images cluster models may be selected that are both textually similar to the web images textual information and are visually similar to the web image. FIG. 5 shows an illustrative method for annotating web images 500 according to one implementation. The term "web image" is to be interpreted broadly and is generally any image with textual information such as keyword(s), labels, textual information, etc. Like the personal image, the web image could be downloaded from an Internet website, retrieved from a computing device (e.g., personal computer, digital camera, picture phone, personal digital assistant, to name a few), scanned from hard copy, or retrieved from any other source of digital images, at block 502.

Once the web image (i.e., query image) has been selected, the image's visual features are extracted using a gray block technique and the vector image is reduced by employing a projection matrix, at block 504. The associated textual features are recorded in a database or other form of archive.

The query image's hash value is calculated by using the mean value of the image vector "$mean_k$" and for values above $mean_k$ the image vector is assigned a value of 1, and for values below $mean_k$ the image vector is assigned a value of 0. This transforms the K-dimensional image vector into a K-bit binary string, which becomes the query images hash code, at block 506.

A two-step probabilistic model is used to annotate web images. First, the available texts "n" may be ranked based on the probability that query image "I" is associated with the image cluster "c" (i.e., p(I/c)) and the text n is associated with the cluster c (i.e., p(n/c)). The lowest ranked words are discarded and the highest ranked words serve as the candidate annotations n*, at block 508.

The new candidate annotations "w*" are acquired and ranked by computing the average conditional probability $P(w,I/n_i*)$ for each candidate annotation. The candidate annotations "w*" with the highest average conditional probabilities are selected to annotate the web image, at block 510.

CONCLUSION

Although implementations have been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method of annotating an image comprising:
    extracting and indexing both visual features and textual information from a plurality of images and a two step probabilistic modeling technique comprising identifying words from the textual information as candidate annotations and annotating the image with the candidate annotations that have the highest average conditional probabilities;
    hashing the plurality of visual features;
    clustering the plurality of images based at least in part on hash values derived from the hashing, the clustering creating clustered images;
    building one or more statistical language models based at least in part on the visual features and the textual information of the clustered images; and
    annotating the image using one or more of the statistical language models.

2. A method of annotating an image as recited in claim 1, wherein the plurality of images are gathered by crawling one or more large-scale image databases.

3. A method of annotating an image as recited in claim 1, wherein hashing the plurality of visual features comprises a vector quantization process in which the visual features are transformed into a binary string.

4. A method of annotating an image as recited in claim 1, wherein the images with the same hash code are grouped into clusters.

5. A method of annotating an image as recited in claim 1, wherein the one or more statistical language models is a unigram model that calculates a probability that a word is associated with the image based at least in part on (1) a visual similarity between the image and the clustered images and (2) a prior probability of the clustered images.

6. A method of annotating an image as recited in claim 1, wherein the one or more statistical language models is a bigram model that calculates an average conditional probability that a second word is associated with the clustered images given a first word already associated with the clustered images.

7. A method of annotating an image as recited in claim 1, further comprising extracting visual information from the plurality of images by using a gray block methodology.

8. A method of annotating an image as recited in claim 7, wherein the gray block methodology comprises:
    partitioning the image into equal size blocks,
    measuring an average luminescence for each block, and
    representing the image as a vector.

9. A method of annotating an image as recited in claim 7, further comprising reducing the visual information of the plurality of images by employing a projection matrix.

10. A computer readable storage medium comprising computer executable instructions that when executed by a processor perform a method comprising:
    crawling a large-scale image database to gather a plurality of images;
    compiling visual features and textual information from the plurality of images;
    extracting visual information from the plurality of images by using a gray block methodology;
    reducing the visual information by employing a projection matrix;

hashing the reduced visual information, and clustering the plurality of images based on a hash value;

building one or more statistical language models based on the clustered images; and annotating a query image using one or more of the statistical language models comprising a bigram model that calculates an average conditional probability that a second word is associated with the clustered images given a first word already associated with the clustered images.

11. A computer readable storage medium as recited in claim 10, wherein hashing the reduced visual information comprises a vector quantization process in which the visual features are transformed into a binary string.

12. A computer readable storage medium as recited in claim 10, wherein the images with the same hash code are grouped into clusters.

13. A computer readable storage medium as recited in claim 10, wherein the query image is previously associated with textual information, and the image is annotated by a two step probabilistic modeling technique comprising:

identifying words from the textual information as candidate annotations; and annotating the image with the candidate annotations that have the highest average conditional probabilities.

14. A computer readable storage medium comprising:

a digital image;

a textual annotation corresponding to the digital image; and executable instructions that when executed by a processor, associate the textual annotation with the digital image by:

compiling visual features and textual information from a plurality of images;

extracting visual information from the plurality of images by using a gray block methodology;

hashing the plurality of visual features, wherein hashing the reduced visual information comprises a vector quantization process in which the visual features are transformed into a binary string;

clustering the plurality of images based on the hash value;

building one or more statistical language models based on the clustered images; and annotating the image using one or more of the statistical language models comprising a unigram model that calculates a probability that a word is associated with the image based at least in part on (1) a visual similarity between the image and the clustered images and (2) a prior probability of the clustered images.

15. A computer readable storage medium as recited in claim 14, wherein the plurality of images are gathered by crawling one or more large-scale image databases.

16. A computer readable storage medium as recited in claim 14, wherein the annotating comprises a two step probabilistic modeling technique including:

identifying words from the textual information as candidate annotations; and annotating the image with the candidate annotations that have the highest average conditional probabilities.

* * * * *